US009552027B2

(12) United States Patent
Chen et al.

(10) Patent No.: US 9,552,027 B2
(45) Date of Patent: Jan. 24, 2017

(54) CONTROL METHOD AND ELECTRONIC DEVICE

(71) Applicant: MediaTek Singapore Pte. Ltd., Singapore (SG)

(72) Inventors: Wen-Chih Chen, Taipei (TW); Bang Fu, Chengdu (CN); Shuaiqiang Ji, Yanshi (CN); Shu-yuan Hu, Anqing (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 368 days.

(21) Appl. No.: 14/084,377

(22) Filed: Nov. 19, 2013

(65) Prior Publication Data

US 2014/0218316 A1   Aug. 7, 2014

(30) Foreign Application Priority Data

Feb. 6, 2013   (CN) .......................... 2013 1 0046649

(51) Int. Cl.
*G06F 1/20* (2006.01)
*G06F 1/28* (2006.01)
*G06F 11/30* (2006.01)
*G06F 11/34* (2006.01)

(52) U.S. Cl.
CPC ................ *G06F 1/206* (2013.01); *G06F 1/28* (2013.01); *G06F 11/3017* (2013.01); *G06F 11/3058* (2013.01); *G06F 11/3062* (2013.01); *G06F 11/3438* (2013.01); *G06F 2201/81* (2013.01); *G06F 2201/88* (2013.01); *Y02B 60/1275* (2013.01); *Y02B 60/165* (2013.01)

(58) Field of Classification Search
CPC ............ G06F 11/34; G06F 1/206; G06F 1/28; G06F 3/041–3/047; G06F 11/3017; G06F 11/3058; G06F 11/3062; G06F 11/3438; G06F 2201/81; G06F 2201/88; Y02B 60/1275; Y02B 60/165
USPC ........................................................ 345/173
See application file for complete search history.

(56) References Cited

U.S. PATENT DOCUMENTS

| | | | | |
|---|---|---|---|---|
| 2006/0284857 | A1* | 12/2006 | Oh ........................ | G06F 1/3203 345/173 |
| 2009/0195212 | A1* | 8/2009 | Chiasson ............ | G01R 31/3679 320/136 |
| 2010/0197352 | A1 | 8/2010 | Runstedler et al. | |
| 2012/0066439 | A1* | 3/2012 | Fillingim ............ | G06F 11/3485 711/103 |

(Continued)

FOREIGN PATENT DOCUMENTS

CN   101183433 B   8/2012

*Primary Examiner* — Dmitriy Bolotin
(74) *Attorney, Agent, or Firm* — McClure, Qualey & Rodack, LLP (57) ABSTRACT

A control method and an electronic device utilizing the same are described. The control method, applied to an electronic device which contains at least one of a battery and a touch panel, including: detecting at least one of a temperature of the battery, a consumption rate of the battery, a display time of the touch panel and a touch frequency of the touch panel; and when at least one of the temperature of the battery, the consumption rate of the battery, the display time of the touch panel and the touch frequency of the touch panel meets at least one trigger condition, initiating a protection mechanism.

24 Claims, 6 Drawing Sheets (56) References Cited

U.S. PATENT DOCUMENTS

2012/0260118 A1\* 10/2012 Jiang .................... G06F 9/4843
713/340
2013/0065093 A1\* 3/2013 White .................. H01M 10/42
429/50

\* cited by examiner

CONTROL METHOD AND ELECTRONIC DEVICE

CROSS REFERENCE TO RELATED APPLICATIONS

This Application claims priority of China Patent Application No. 201310046649.2, filed on Feb. 6, 2013, and the entirety of which is incorporated by reference herein.

BACKGROUND OF THE INVENTION

Field of the Invention

The present invention relates to a control method and an electronic device utilizing the same, and in particular to a control method for initializing a protection mechanism and an electronic device utilizing the same.

Description of the Related Art

Diversity of electronic devices is growing as technology advances. As a user depends on various electronic devices in everyday life, it has become an issue that the electronic devices are often heavily used without the user's awareness, and the life spans of the electronic devices are consequently reduced. Moreover, long-term use of the electronic devices might result in damage to the user's health, such as vision.

BRIEF SUMMARY OF THE INVENTION

A detailed description is given in the following embodiments with reference to the accompanying drawings.

An embodiment of a control method is described, applied to an electronic device which comprises at least one of a battery and a touch panel, the control method comprising: detecting at least one of a temperature of the battery, a consumption rate of the battery, a display time of the touch panel and a touch frequency of the touch panel; and when at least one of the temperature of the battery, the consumption rate of the battery, the display time of the touch panel and the touch frequency of the touch panel meets at least one trigger condition, initiating a protection mechanism.

Another embodiment of an electronic device is disclosed, comprising a battery, a touch panel, a detection module and a control module. The detection module, configured to detect at least one of a temperature of the battery, a consumption rate of the battery, a display time of the touch panel and a touch frequency of the touch panel. The control module, configured to initiate a protection mechanism according to a detection result of the detection module, wherein when at least one of the temperature of the battery, the consumption rate of the battery, the display time of the touch panel and the touch frequency of the touch panel meets at least one of trigger conditions, the control module is configured to initiate the protection mechanism.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Under long-duration usage, an electronic device can easily become damaged and short-lived. However, the embodiments of the invention can determine whether an electronic device has been used for a long duration by sensing the electronic device. And a protection mechanism is initiated when the electronic device has been used for a long duration, thereby preventing the electronic device from being damaged.

Figure 1:
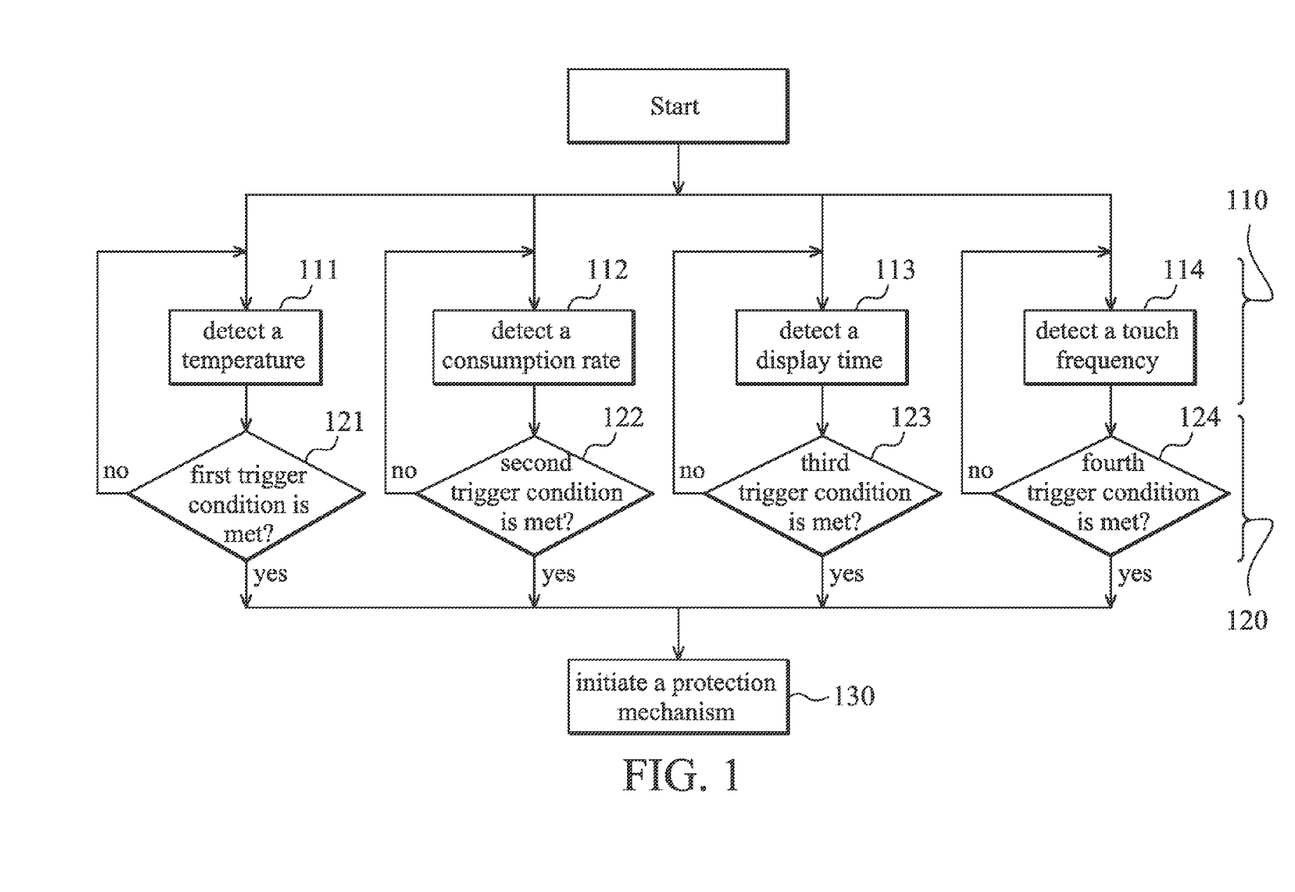
FIG. 1 illustrates a control method according to an embodiment of the invention.

FIG. 1 illustrates a control method according to an embodiment of the invention. The control method of the embodiment is applicable to an electronic device, which includes a battery and a touch panel. To begin with, a status of the electronic device is detected (Step 110). In the embodiment, Step 110 includes Steps 111 through 114, where in Step 111, detect the battery temperature of the electronic device, in Step 112, detect a consumption rate of the battery of the electronic device, in Step 113, detect a display time of the touch panel of the electronic device, in Step 114, detect a touch frequency of the touch panel.

In one embodiment, Steps 111 through 114 are performed concurrently. The invention, however, is not limited to the particular embodiment. In another embodiment, Steps 111 through 114 are performed in sequence. In yet another embodiment, a combination of Steps 111 through 114 has been adopted for detecting the status of the electronic device. In still another embodiment, only a part of Steps 111 through 114 is carried out.

Next, the control method then determines whether a trigger condition is met (Step 120). In one embodiment, Step 120 includes Steps 121 through 124, where in Step 121, determine whether the battery temperature of the electronic device meets a first trigger condition, such as the temperature is greater or equal to a temperature threshold, or the number of occurrences of the temperature being greater or equal to the temperature threshold exceeds or equals a first predetermined number.

In Step 122, determine whether the consumption rate of the battery of the electronic device meets a second trigger condition, such as the consumption rate is greater or equal to a consumption rate threshold, or the number of occurrences of the consumption rate being greater or equal to the temperature threshold exceeds or equals a second predetermined number.

In Step 123, determine whether the display time of the touch panel of the electronic device meets a third trigger condition, such as the display time exceeds or equals a display time threshold, or within a fixed duration, an accumulated display time of the touch panel exceeds or equals a predetermined time.

In Step 124, determine whether the touch frequency of the touch panel of the electronic device meets a fourth trigger condition, such as the touch frequency exceeds or equals a touch frequency threshold, or the number of occurrences of the touch frequency being greater or equal to the touch frequency threshold exceeds or equals a third predetermined number.

When at least one of the battery temperature, the battery consumption rate, the display time of the touch panel and the touch frequency of the touch panel meets the corresponding trigger condition, or, in other words, at least one of Steps 121 through 124 is true, a protection mechanism will be initiated (Step 130).

In one embodiment, when the display time of the touch panel and the touch frequency of the touch panel both meet the corresponding trigger conditions, a protection mechanism is initiated. Nevertheless, when the touch panel is set to be always-on, then the control method can only determine whether the user has been using the touch panel for a long period, by detecting the touch frequency of touch panel, thereby initiating the protection mechanism for protecting the electronic device.

In another embodiment, when the battery temperature and the consumption rate of the battery both meet the corresponding trigger conditions, a protection mechanism is initiated. Nevertheless, when the battery is charging, then the control method cannot determine the use status of the electronic device based on the consumption rate of the battery. Thus, the control method has to determine whether the electronic device is under heavy usage by detecting the battery temperature.

In yet another embodiment, when the battery temperature or the consumption rate of the battery meets the corresponding trigger condition, and the touch frequency of the touch panel also meets the corresponding trigger condition, a protection mechanism is initiated. However, when watching a video using the touch panel, the touch panel can stay untouched by a user for a long time, and consequently the touch frequency of the touch panel is low. In the embodiment, the control method can determine whether a user has used the electronic device for a long time by incorporating the detection of the battery temperature or the battery consumption rate.

The embodiments of the invention are not limited to the description in the preceding section. Those skilled in the art can incorporate a combination of the detection and determination steps in the preceding section to implement the embodiment without deviating from the principle of the invention.

Figure 2:
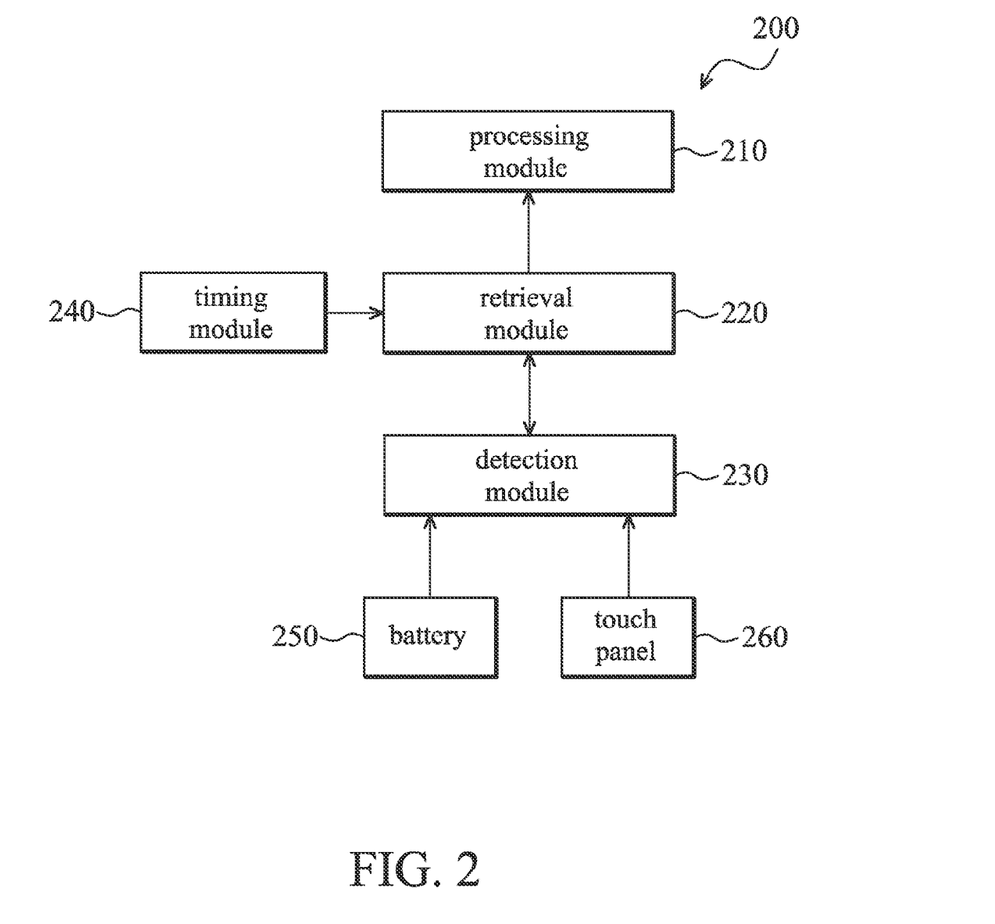
FIG. 2 is a block diagram of an electronic device according to an embodiment of the invention.

FIG. 2 is a block diagram of an electronic device according to an embodiment of the invention. The electronic device 200 contains a processing module 210, a retrieval module 220, a detection module 230, a timing module 240, a battery 250 and a touch panel 260. The embodiments of the invention are not limited to the types of the electronic devices. In one embodiment, the electronic device 200 is a portable electronic device such as a mobile phone.

The detection module 230 is coupled to the battery 250 and the touch panel 260 for detection. In the embodiment, the detection module 230 detects at least one of the temperature of the battery 250, the consumption rate of the battery 250, the display time of the touch panel 260 and the touch frequency of the touch panel 260 in a regular and periodic manner, and stores the detection results in an internal or external data storage device (not shown). The internal circuit architecture of the detection module 230 is not limited in the embodiment of the invention. Any hardware circuit or software architecture which can provide the functions of the detection module can be adopted as the detection module 230.

Further, the types of the battery 250 and the touch panel 260 are also not limited in the invention. Any battery which can provide power can be used as the battery 250, any panel which equips a touch function can be used as the touch panel 260.

Based on a timing result from the timing module 240, the retrieval module 220 is configured to retrieve the detection result detected by the detection module 230 from the internal or external data storage device every fixed time interval, and deliver the retrieved result to the processing module 210. In one embodiment, the retrieval module 220 is configured to convert the detection result detected by the detection module 230 into electrical signals which the processing module 210 can process.

The internal circuits and architectures of the retrieval module 220 and the timing module 240 are not limited in the invention. Any hardware circuit or software architecture which can provide the functions of the retrieving and timing functions can be adopted as the retrieval module 220 and the timing module 240.

The processing module 210 is configured to determine whether a protection mechanism should be initiated based on an output from the retrieval module 220. In one embodiment, the processing module 210 is configured to store at least one trigger condition. When the retrieved result from the retrieval module 220 meets at least one trigger condition, it would indicate that the user has been using the electronic device for a long time. Therefore, a protection mechanism will be initiated to prevent the electronic device from being damaged.

Figure 3:
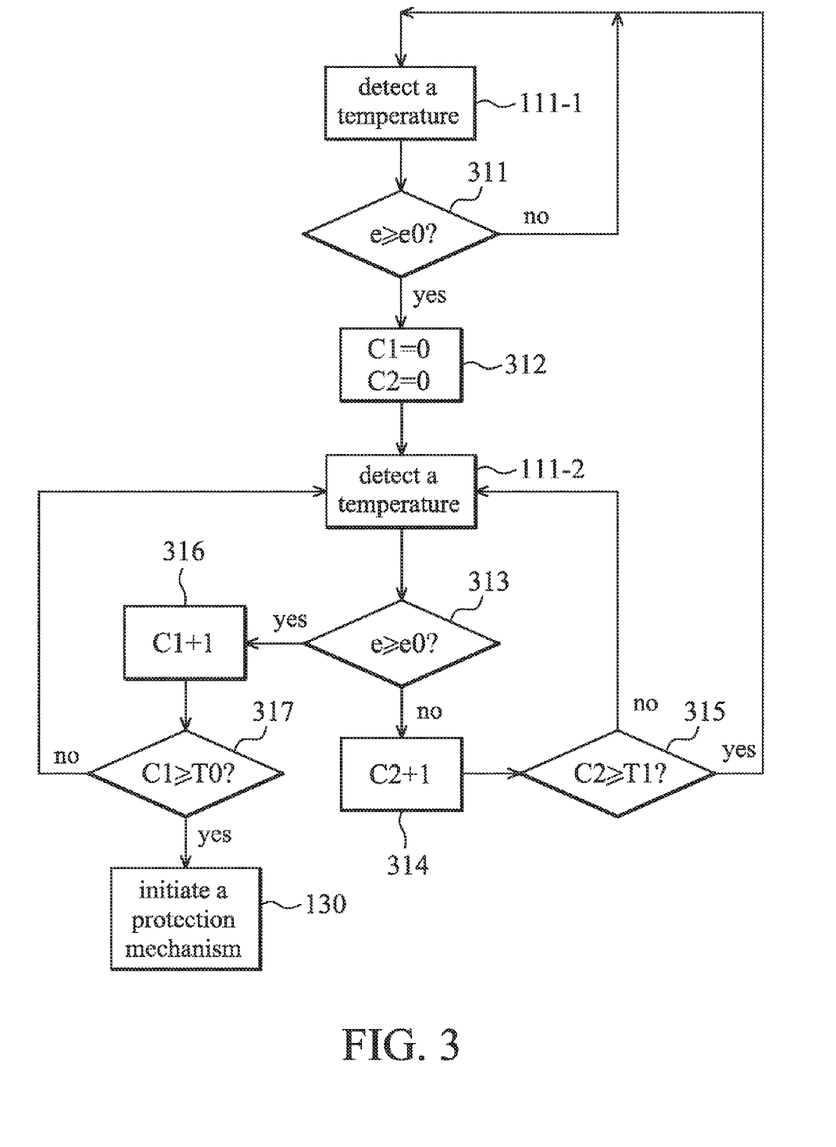
FIG. 3 details how the battery temperature is determined as meeting a trigger condition.

FIGS. 3 through 6 are flowcharts of control methods according to embodiments of the invention. FIG. 3 details how the battery temperature is determined as meeting a trigger condition. In one embodiment, when the number of occurrences of the battery temperature exceeding or equal to a temperature threshold exceeds or equals a first predetermined number of occurrences number, the first trigger condition is met.

Firstly, the battery temperature is determined (Step 111-1), and whether the battery temperature e exceeds or equals a temperature threshold e0 is determined (Step 311). When the battery temperature e does not exceed or equal the temperature threshold e0, the control method returns to Step 111-1. When the battery temperature e exceeds or equals the temperature threshold e0, the control method resets a first and a second counting values C1 and C2 (Step 312). In one embodiment, the two counting values C1 and C2 of the two counters are reset to 0.

Next, the battery temperature is detected again (Step 111-2) to determine whether the battery temperature e exceeds or equals the temperature threshold e0 (Step 313). When the battery temperature e exceeds or equals the temperature threshold e0, the first counting value C1 is incremented (Step 316) and the control method then determines whether the first counting value C1 exceeds or equals the first predetermined number T0 (Step 317). When the first counting value C1 exceeds or equals the first predetermined number T0, the protection mechanism is initiated (Step 130). When the first counting value C1 does not exceed or equal to the first predetermined number T0, it would indicate that the battery temperature e is not always high, the control method returns to Step 111-2.

However, when the battery temperature e does not exceed or equal the first predetermined threshold e0, the second counting value C2 is incremented (Step 314), and the control method then determines whether the second counting value C2 exceeds or equals the second predetermined number T1 (Step 315). When the second counting value C2 does not exceed or equal the second predetermined number T1, the control method returns to Step 111-2. When the second counting value C2 exceeds or equals the second predetermined number T1, it would indicate that the battery temperature e has decreased, thus the control method returns to Step 111-1.

Figure 4:
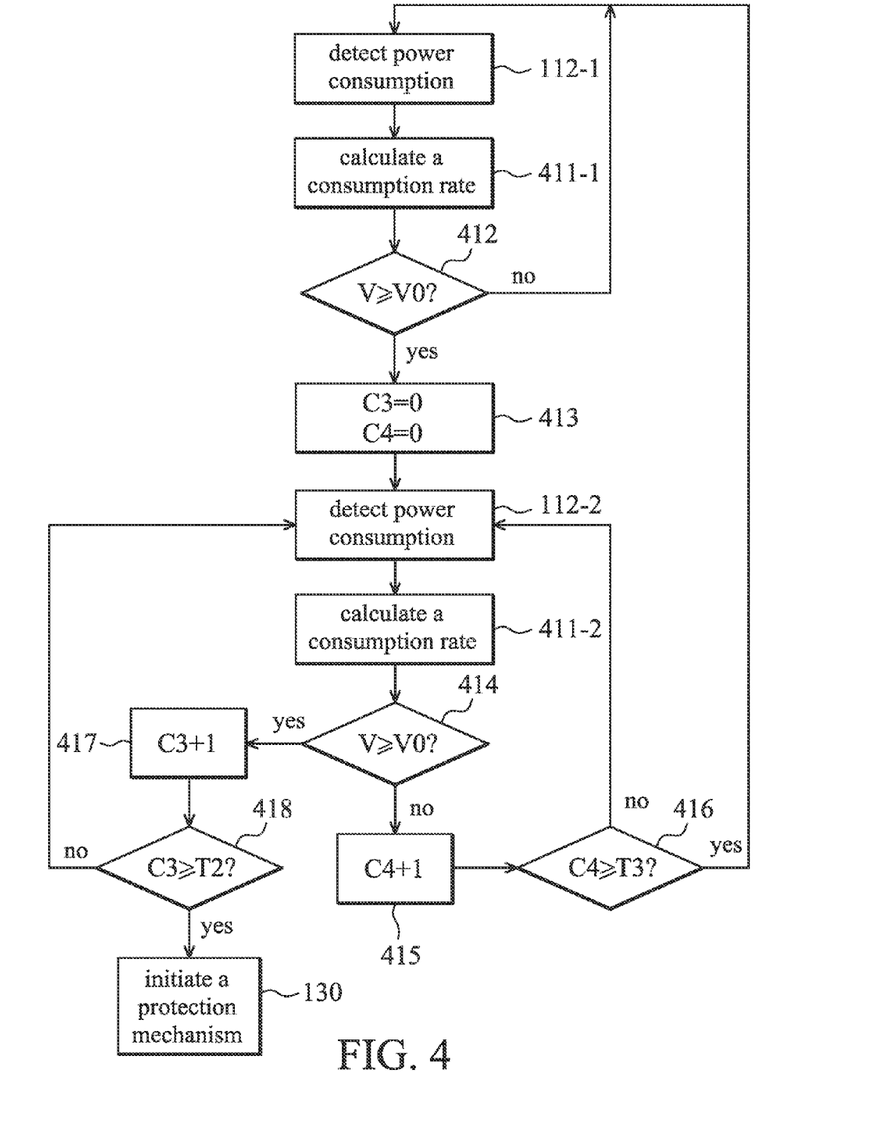
FIG. 4 details how the battery consumption rate is determined as meeting a trigger condition.

FIG. 4 details how the battery consumption rate is determined as meeting a trigger condition. In one embodiment, when the number of occurrences of the battery consumption rate exceeding or equal to a consumption rate threshold exceeds or equals a second predetermine number of occurrences number, it would indicate that the battery consumption rate is considerably large, thus the second trigger condition is met.

Firstly, the consumed battery power is detected (Step 112-1), and the battery consumption rate is calculated (Step 411-1). In one embodiment, the consumed battery power $\Delta C$ detected in Step 112-1 is divided by a consumption time $\Delta T$ to derive the battery consumption rate V, that is, $V=\Delta C/\Delta T$.

Next, the control method then determines whether the consumption rate V exceeds or equals a consumption rate threshold V0 (Step 412). When the consumption rate V does not exceed or equal the consumption rate threshold V0, the control method returns to Step 112-1, continuing detecting the consumption rate V. When the consumption rate V exceeds or equals the consumption rate threshold V0, the control method resets the third and fourth counting values C3 and C4 (Step 413). In one embodiment, the third and fourth counting values C3 and C4 of two counters are set to 0.

The control method then again detects the consumed power (Step 112-2) and the consumption rate (Step 411-2) of the battery, and determines whether the consumption rate V exceeds or equals the consumption rate threshold V0 (Step 414). When the consumption rate V exceeds or equals the consumption rate threshold V0, a third counter C3 is incremented (Step 417) and then the control method determines whether the third counting value C3 exceeds or equals the third predetermined number T2 (Step 418). When the third counting value C3 exceeds or equals the third predetermined number T2, a protection mechanism will be initiated (Step 130). When the third counting value C3 does not exceed or equal the third predetermined number T2, the control method returns to Step 112-2.

When the consumption rate V does not exceed or equal the consumption rate threshold V0, a fourth counting value C4 is incremented (Step 415), and the control method then determines whether the fourth counting value C4 exceeds or equals a fourth predetermined number T3 (Step 416). When the fourth counting value C4 exceeds or equals the fourth predetermined number T3, the control method returns to Step 112-1. When the fourth counting value C4 does not exceed or equal the fourth predetermined number T3, the control method returns to Step 112-2, and then again detects the consumed power and consumption rate of the battery, and continue determining whether the consumption rate V exceeds or equals the consumption rate threshold V0.

Figure 5:
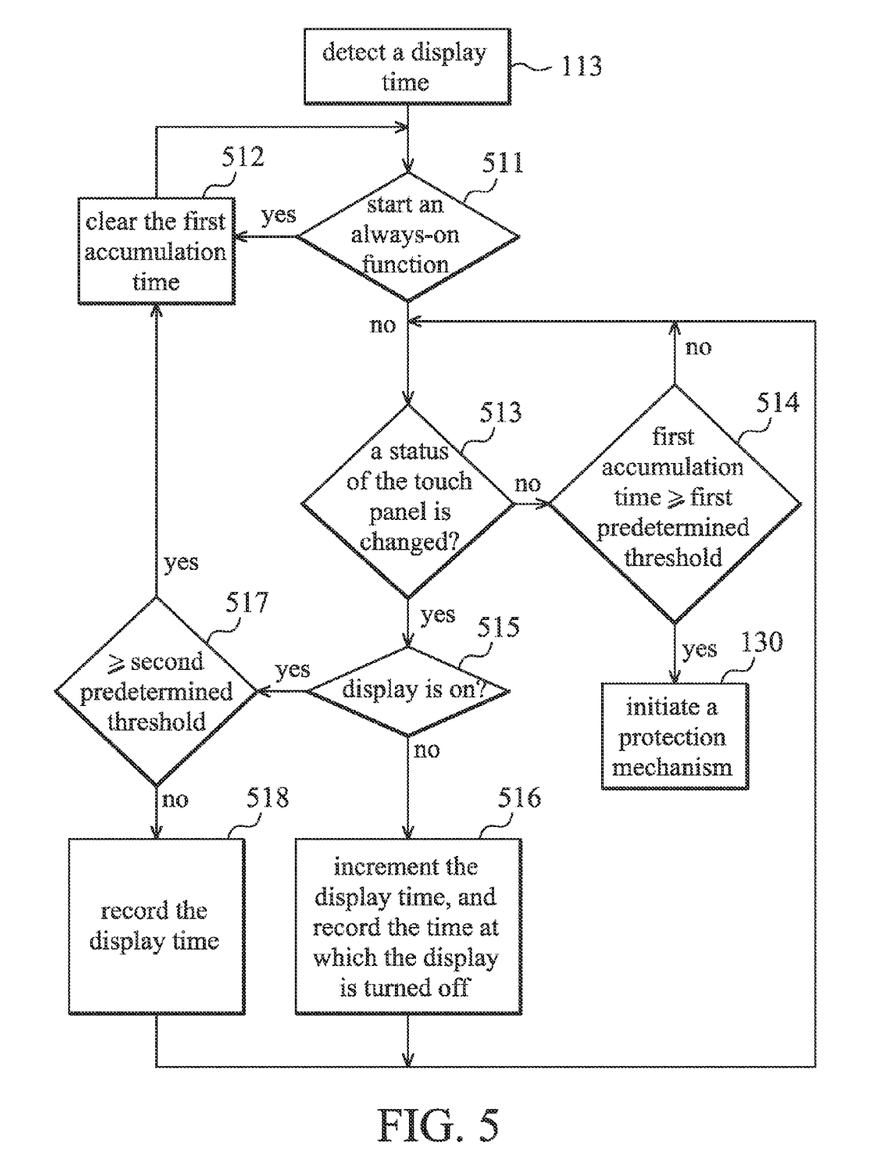
FIG. 5 details how the display time of the touch panel is determined as meeting a trigger condition.

FIG. 5 details how the display time of the touch panel is determined as meeting a trigger condition. In one embodiment, the display time of the touch panel is detected and accumulated to generate a first accumulation time (Step 113). When the first accumulation time exceeds or equals a first predetermined threshold, it would indicate that the touch panel has remained on for a long time, thus the third trigger condition is met.

In another embodiment, the control method determines whether an always-on function of the electronic device is activated (Step 511), for example, the control method can determine the activation of the always-on function by reading a corresponding configuration option. When the always-on function is activated on the electronic device, it indicates that the touch panel is always on. Therefore, the control method will clear the first accumulation time (Step 512) and return to Step 511.

When the always-on function is not activated on the electronic device, the control method can determine whether the status of the touch panel is changed (Step 513). In one embodiment, when the status of the touch panel has been changed from an On-state to an Off-state, or from an Off-state to an On-state, it indicates that the status of the touch panel has changed.

In one embodiment, when the touch panel is turned on or off, the electronic device will internally broadcast a corresponding on-broadcast or off-broadcast. By determining the type of broadcast received, the status of the touch panel can be determined (as being in the On-state or the Off-state).

When the status of the touch panel remains unchanged, and the touch panel stays in the on-state, the control method can determine whether the first accumulation time exceeds or equals a first predetermined threshold (Step 514). When the first accumulation time exceeds or equals the first predetermined threshold, it indicates that the touch panel has been turned on for a long time, thus a protection mechanism is initiated (Step 130). When the first accumulation time does not exceed or equal the first predetermined threshold, the control method returns to Step 513, re-determining whether the status of the touch panel has been changed.

When the status of the touch panel has changed (from the On-state to the Off-state, or from the Off-state to the On-state), the status of the touch panel can be determined (Step 515). When the touch panel is not at the on-state, the time which the touch panel remains in the On-state is accumulated to produce the first accumulation time, also the time at which the touch panel is turned off is recorded (Step 516). When the touch panel is at the on-state, the time which the touch panel remains in the Off-state is accumulated to produce a second accumulation time, and whether the second accumulation time exceeds or equals a second predetermined threshold is determined (Step 517).

When the second accumulation time exceeds or equals the second predetermined threshold, the control method clears the first and second accumulation times (Step 512), and returns to Step 511. When the second accumulation time does not exceed or equal the second predetermined threshold, the control method records the time at which the touch panel is turned on (Step 518), and returns to Step 513, re-determining whether the status of the touch panel is changed.

In one embodiment, the time at which the touch panel is being turned on or off can be used to determine whether the on-duration or the off-duration of the touch panel is too short. When the touch panel is turned off and then quickly turned on again, then the two On-state and Off-state can be ignored. When the Off-state is long, then the first accumulation time can be cleared, re-accumulating the duration of each of the On-state and the off-state.

Figure 6:
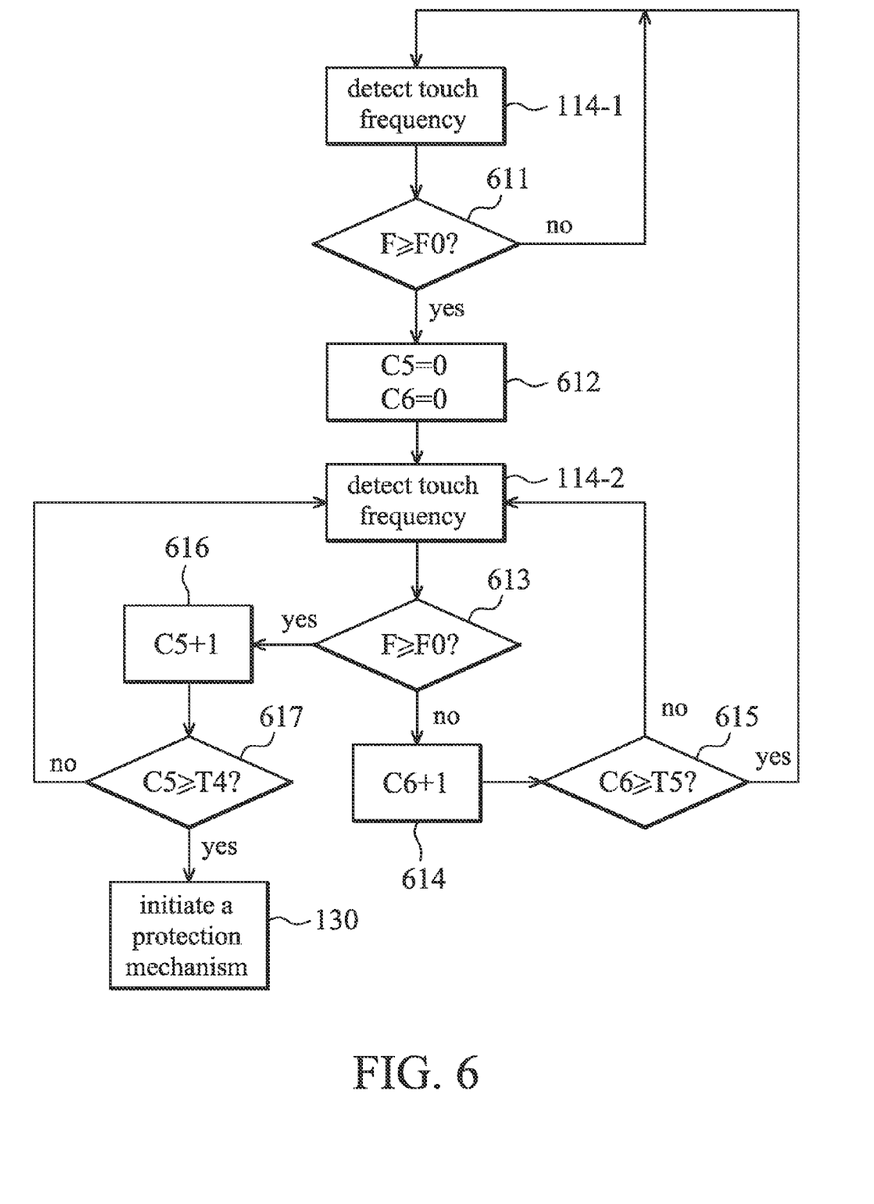
FIG. 6 details how the touch frequency of the touch panel is determined as meeting a trigger condition.

FIG. 6 details how the touch frequency of the touch panel is determined as meeting a trigger condition. In one embodiment, when the number of occurrences of the touch frequency of the touch panel exceeding or equal to a touch frequency threshold exceeds or equals a fifth predetermined number, it indicates that the touch panel is constantly being touched, thus the fourth trigger condition is met.

Firstly, the touch frequency F of the touch panel is detected (Step 114-1), and whether the touch frequency F exceeds or equals a touch frequency threshold F0 is determined (Step 611). When the touch frequency F does not exceed or equal the touch frequency threshold F0, the control method returns to Step 114-1. When the touch frequency F exceeds or equals the touch frequency threshold F0, the control method resets a fifth and a sixth counting values C5 and C6 (Step 612). In one embodiment, the fifth and sixth counting values C5 and C6 are reset to 0.

Next, the touch frequency F of the touch panel is detected again (Step 114-2) to determine whether the touch frequency F exceeds or equals the touch frequency threshold F0 (Step 613). When the touch frequency F does exceed or equal the touch frequency threshold F0, the fifth counting value C5 is incremented (Step 616) and the control method then determines whether the fifth counting value C5 exceeds or equals a fifth predetermined number T4 (Step 617). When the fifth counting value C5 exceeds or equals the fifth predetermined number T4, the protection mechanism is initiated (Step 130). When the fifth counting value C5 does not exceed or equal the fifth predetermined number T4, the control method returns to Step 114-2.

When the touch frequency F does not exceed or equal the touch frequency threshold F0, the sixth counting value C6 is incremented (Step 614), and the control method then determines whether the sixth counting value C6 exceeds or equals a sixth predetermined number T5 (Step 615). When the sixth counting value C6 exceeds or equals a sixth predetermined number T5, the control method returns to Step 114-2. When the sixth counting value C6 does not exceed or equal a sixth predetermined number T5, the control method returns to Step 114-2. It is worth noting that the plurality of thresholds and predetermined numbers can be configured according various design preferences.

When at least one of the battery temperature, the battery consumption rate, the display time of the touch panel and the touch frequency of the touch panel meets the corresponding trigger condition, a protection mechanism will be initiated, to prevent the electronic device from being used for a long time and decreasing the product life. The type of the protection mechanism is not limited in the embodiments of the invention. In one embodiment, the protection mechanism involves a forced shutdown or resetting the electronic device.

In another embodiment, the protection mechanism involves putting certain functions of the plurality of the functions of the electronic device into a black list, and restricting execution of the functions listed in the black list. In yet another embodiment, the protection mechanism involves putting certain functions of the plurality of the functions of the electronic device into a white list, and only executing the functions listed in the white list.

For example, if the electronic device is a mobile phone, then after the protection mechanism is initiated, the electronic device can only execute certain basic functions (such as the call function or the message function), other non-basic functions (such as watching a video or playing a game) is forbidden from being executed.

When the protection mechanism has been activated for a predetermined duration, or higher priority permission is received, the protection mechanism can be stopped. Therefore the user can once again use all the functions of the electronic device. In one embodiment, when the user intends to use the electronic device, the electronic device can determine the user rights based on a password input by the user or based on facial recognition of the user, and determine which type of the protection mechanism is to be adopted based on the determined user rights.

For example, when the user is an adult, the protection mechanism can be looser. For example, when a trigger condition is met, a black list will be activated. When the user is underage, the protection mechanism can be stricter. For example, when a trigger condition is met, a white list will be activated. The trigger conditions and the protection mechanism can be configured by a user with a particular identity.

By detecting the battery temperature, the battery consumption rate, the display time and the touch frequency of the touch panel, whether the electronic device is heavily used by a user can be determined. When at least one of the battery temperature, the battery consumption rate, the display time and the touch frequency of the touch panel meets a corresponding trigger condition, a protection mechanism will be initiated, preventing the electronic device from being used for a long time and reducing the product life.

Unless defined otherwise, all terminology used in the disclosure (including technical and scientific terminology) comply with general understanding adopted by those skilled in the art. Further, unless otherwise indicated, the terms defined in the disclosure agree with dictionaries and relevant technical papers in the related art, and should not be interpreted as an ideal condition.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control method, applied to an electronic device which comprises at least one of a battery and a touch panel, wherein the control method comprising:
    detecting at least one of a temperature of the battery, a consumption rate of the battery, a display time of the touch panel and a touch frequency of the touch panel; and
    when at least one of the temperature of the battery, the consumption rate of the battery, the display time of the touch panel and the touch frequency of the touch panel meets at least one of trigger conditions, initiating a protection mechanism,
    wherein the at least one of the trigger conditions comprises: number of occurrences of the consumption rate exceeding or equal to a consumption rate threshold exceeds or equals a second predetermined number.

2. The control method of claim 1, wherein the at least one of the trigger conditions comprises: number of occurrences of the temperature exceeding or equal to a temperature threshold exceeds or equals a first predetermined number.

3. The control method of claim 2, further comprising:
    comparing the temperature with the temperature threshold; and
    when the temperature exceeds or equals the temperature threshold, incrementing a first counting value; and
    when the first counting value exceeds or equals the first predetermined number, initiating the protection mechanism.

4. The control method of claim 3, further comprising:
when the temperature does not exceed or equal the temperature threshold, incrementing a second counting value; and
when the second counting value exceeds or equals a second predetermined number, resetting the first and second counting values.

5. The control method of claim 1, further comprising:
comparing the consumption rate with the consumption rate threshold; and
when the consumption rate exceeds or equals the consumption rate threshold, incrementing a first counting value; and
when the first counting value exceeds or equals the second predetermined number, initiating the protection mechanism.

6. The control method of claim 5, further comprising:
when the consumption rate does not exceed or equal the consumption rate threshold, incrementing a second counting value; and
when the second counting value exceeds or equals a third predetermined number, resetting the first and second counting values.

7. The control method of claim 1, wherein the at least one of the trigger conditions comprises: number of occurrences of the touch frequency exceeding or equal to a touch frequency threshold exceeds or equals a third predetermined number.

8. The control method of claim 7, further comprising:
comparing the touch frequency with the touch frequency threshold; and
when the touch frequency exceeds or equals the touch frequency threshold, incrementing a first counting value; and
when the first counting value exceeds or equals the third predetermined number, initiating the protection mechanism.

9. The control method of claim 8, further comprising:
when the touch frequency does not exceed or equal the touch frequency threshold, incrementing a second counting value; and
when the second counting value exceeds or equals a fourth predetermined number, resetting the first and second counting values.

10. The control method of claim 1, further comprising:
accumulating the display time to generate a first accumulation time;
wherein the at least one of the trigger conditions comprises the first accumulation time exceeds or equals a first predetermined threshold.

11. The control method of claim 10, further comprising:
determining whether an always-on function of the electronic device is activated;
wherein when the always-on function is activated, stopping detection of the display time.

12. The control method of claim 10, further comprising:
determining whether a status of the touch panel is changed, wherein the status of the touch panel is changed when the touch panel changes from an On-state to an Off-state, or from the Off-state to the On-state;
when the status of the touch panel remains unchanged, determining whether the first accumulation time exceeds or equals the first predetermined threshold; and
when the first accumulation time exceeds or equals the first predetermined threshold, initiating the protection mechanism.

13. The control method of claim 12, further comprising:
when the first accumulation time does not exceed or equal the first predetermined threshold, re-determining whether the status of the touch panel is changed.

14. The control method of claim 12, further comprising:
accumulating a time during which the touch panel is in the Off-state to generate a second accumulation time;
determining whether the second accumulation time exceeds or equals a second predetermined threshold; and
when the second accumulation time exceeds or equals the second predetermined threshold, clearing the first and second accumulation times.

15. The control method of claim 1, wherein the protection mechanism comprises:
putting a part of a plurality of functions of the electronic device into a black list; and
stopping carrying out the functions in the black list.

16. The control method of claim 1, wherein the protection mechanism comprises:
putting a part of a plurality of functions of the electronic device into a white list; and
only carrying out the functions in the white list.

17. The control method of claim 1, wherein when the protection mechanism has been activated for a predetermined duration, stopping the protection mechanism.

18. An electronic device, comprising:
a battery;
a touch panel;
a detection module, configured to detect at least one of a temperature of the battery, a consumption rate of the battery, a display time of the touch panel and a touch frequency of the touch panel; and
a processing module, configured to initiate a protection mechanism according to a detection result of the detection module, wherein when at least one of the temperature of the battery, the consumption rate of the battery, the display time of the touch panel and the touch frequency of the touch panel meets at least one of trigger conditions, the processing module is configured to initiate the protection mechanism,
wherein the at least one of the trigger conditions comprises: number of occurrences of the consumption rate exceeding or equal to a consumption rate threshold exceeds or equals a second predetermined number.

19. The electronic device of claim 18, further comprising:
a timing module, configured to provide a timing result; and
a retrieval module, configured to retrieve the detection result of the detection module based on the timing result;
wherein the processing module is configured to initiated the protection mechanism according to a retrieval result of the retrieval module.

20. The electronic device of claim 18, wherein when number of occurrences of the temperature exceeding or equal to a temperature threshold exceeds or equals a first predetermined number, the processing module is configured to initiate the protection mechanism.

21. The electronic device of claim 18, wherein when number of occurrences of the touch frequency exceeding or equal to a touch frequency threshold exceeds or equals a third predetermined number, the processing module is configured to initiate the protection mechanism.

22. The electronic device of claim 18, wherein the processing module is configured to accumulate the display time to generate a first accumulation time, and when the first accumulation time exceeds or equals a first predetermined threshold, the processing module is configured to initiate the protection mechanism.

23. The electronic device of claim 18, wherein when at least one of the temperature, the consumption rate, the display time and the touch frequency meets at least one of trigger conditions, the processing module is configured to put a part of a plurality of functions of the electronic device into a black list; and stop carrying out the functions in the black list.

24. The electronic device of claim 18, wherein when at least one of the temperature, the consumption rate, the display time and the touch frequency meets at least one of trigger conditions, the processing module is configured to put a part of a plurality of functions of the electronic device into a white list; and only carry out the functions in the white list.

* * * * *